US012682193B2

(12) United States Patent
Okada

(10) Patent No.: US 12,682,193 B2
(45) Date of Patent: Jul. 14, 2026

(54) PRINTING SYSTEM INCLUDING A STATIC-CONTROL APPARATUS, CONTROL METHOD THEREOF, AND STORAGE MEDIUM

(71) Applicant: CANON KABUSHIKI KAISHA, Tokyo (JP)

(72) Inventor: Hideyuki Okada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/420,070

(22) Filed: Jan. 23, 2024

(65) Prior Publication Data

US 2024/0256812 A1      Aug. 1, 2024

(30) Foreign Application Priority Data

Jan. 31, 2023    (JP) .................................. 2023-012577

(51) Int. Cl.
G06K 15/00          (2006.01)
G06K 15/16          (2006.01)
H04N 1/00           (2006.01)

(52) U.S. Cl.
CPC ....... *G06K 15/4025* (2013.01); *G06K 15/005* (2013.01); *G06K 15/16* (2013.01); *H04N 1/00976* (2013.01); *H04N 2201/0094* (2013.01)

(58) Field of Classification Search
CPC .. G06K 15/4025; G06K 15/005; G06K 15/16; H04N 1/00976; H04N 2201/009
See application file for complete search history.

(56) References Cited

U.S. PATENT DOCUMENTS

| | | | |
|---|---|---|---|
| 2008/0290591 A1* | 11/2008 | Shimizu | B41F 23/00 271/208 |
| 2021/0216027 A1* | 7/2021 | Tanaka | G03G 15/0266 |
| 2022/0397858 A1* | 12/2022 | Sugiyama | G03G 15/6588 |

FOREIGN PATENT DOCUMENTS

JP          H11258881 A        9/1999

OTHER PUBLICATIONS

Shu et al. (JP-2020076845 A, machine translated document, Published 2020) (Year: 2020).*

* cited by examiner

*Primary Examiner* — Juan M Guillermety
(74) *Attorney, Agent, or Firm* — Canon U.S.A., Inc. IP Division

(57) ABSTRACT

The present disclosure provides a mechanism of a printing apparatus for displaying a state of a setting of a static removal process performed by a static removal apparatus. A control method for controlling the printing apparatus includes printing an image on a sheet, conveying the sheet on which the image is printed in the printing to the static removal apparatus configured to perform the static removal process on the sheet, and displaying the state of the setting of the static removal process performed by the static removal apparatus.

11 Claims, 11 Drawing Sheets

FIG.3

1000 PRINTING SYSTEM

100 PRINTING APPARATUS 200-3a STATIC REMOVAL APPARATUS 200-3b SADDLE-STITCH BINDING APPARATUS

FIG.7

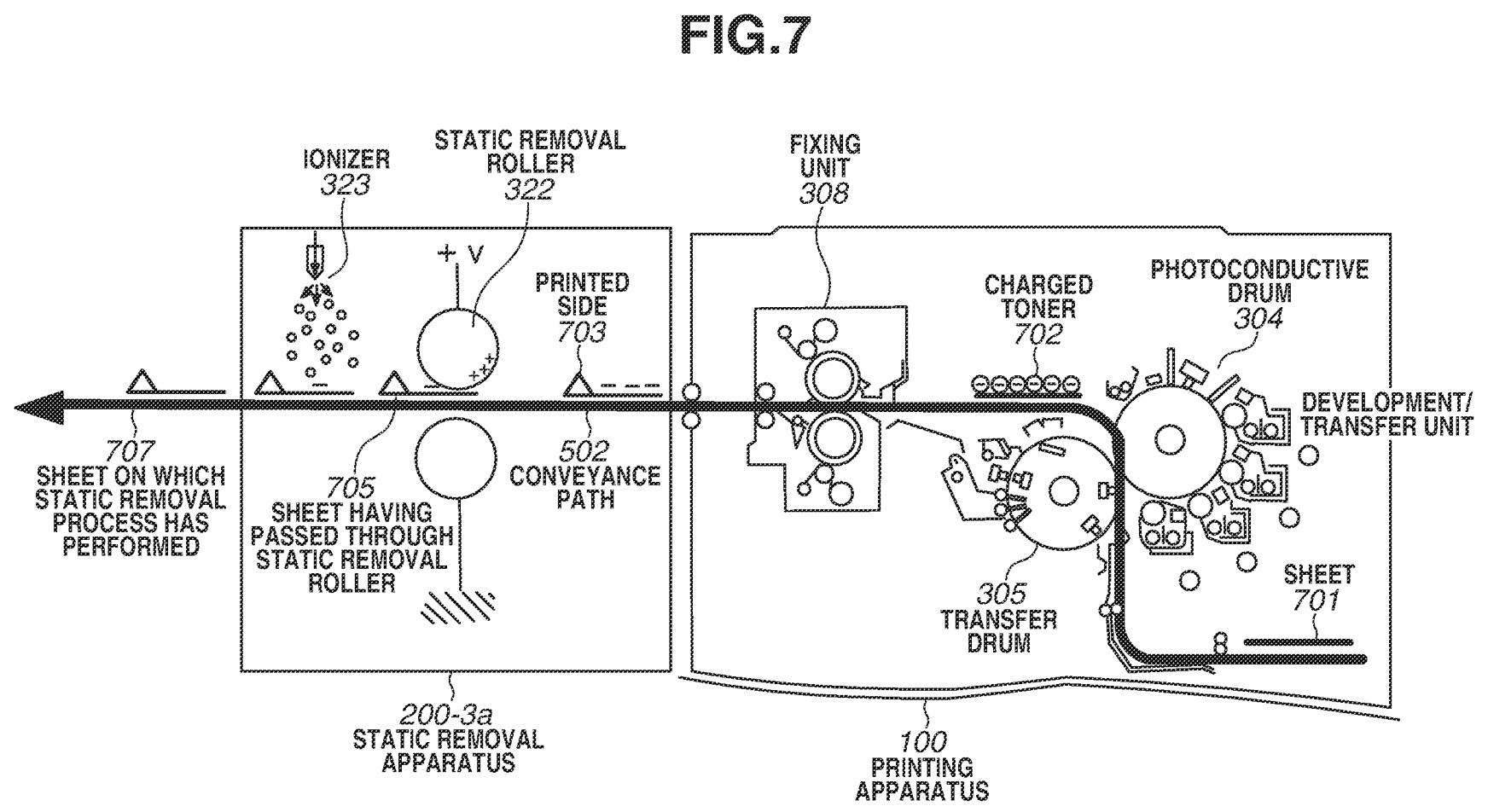

DEVELOPMENT/TRANSFER UNIT

PHOTOCONDUCTIVE DRUM
304

SHEET
701

CHARGED TONER
702

305
TRANSFER DRUM

100
PRINTING APPARATUS

FIXING UNIT
308

STATIC REMOVAL ROLLER
322

PRINTED SIDE
703

+V

502
CONVEYANCE PATH

IONIZER
323

705
SHEET HAVING PASSED THROUGH STATIC REMOVAL ROLLER 200-3a
STATIC REMOVAL APPARATUS

707
SHEET ON WHICH STATIC REMOVAL PROCESS HAS PERFORMED

FIG.8

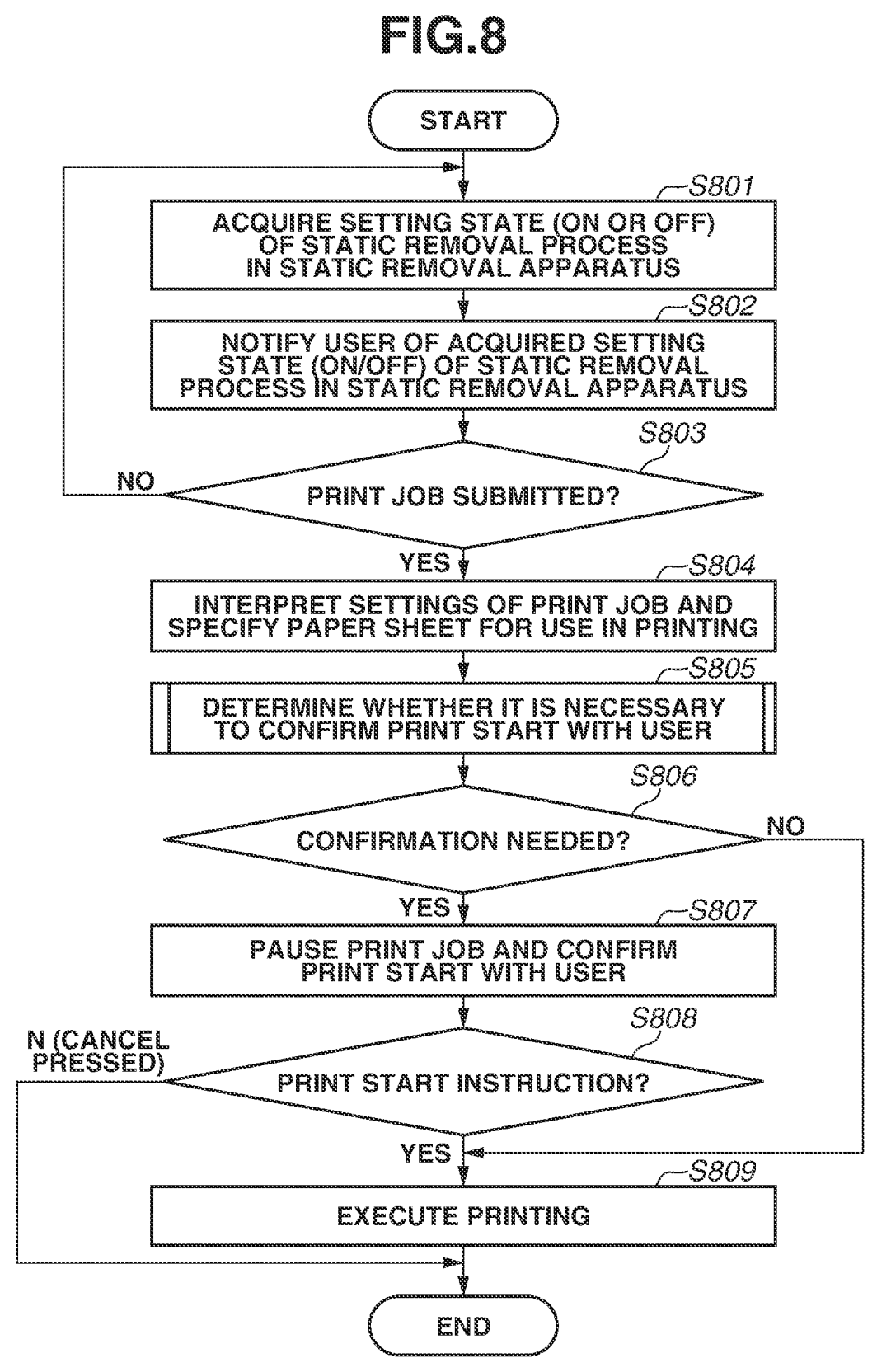

START

S801
ACQUIRE SETTING STATE (ON OR OFF) OF STATIC REMOVAL PROCESS IN STATIC REMOVAL APPARATUS

S802
NOTIFY USER OF ACQUIRED SETTING STATE (ON/OFF) OF STATIC REMOVAL PROCESS IN STATIC REMOVAL APPARATUS

S803
PRINT JOB SUBMITTED? — NO

YES

S804
INTERPRET SETTINGS OF PRINT JOB AND SPECIFY PAPER SHEET FOR USE IN PRINTING

S805
DETERMINE WHETHER IT IS NECESSARY TO CONFIRM PRINT START WITH USER

S806
CONFIRMATION NEEDED? — NO

YES

S807
PAUSE PRINT JOB AND CONFIRM PRINT START WITH USER

S808
PRINT START INSTRUCTION?

N (CANCEL PRESSED)

YES

S809
EXECUTE PRINTING

END

Figure 10:
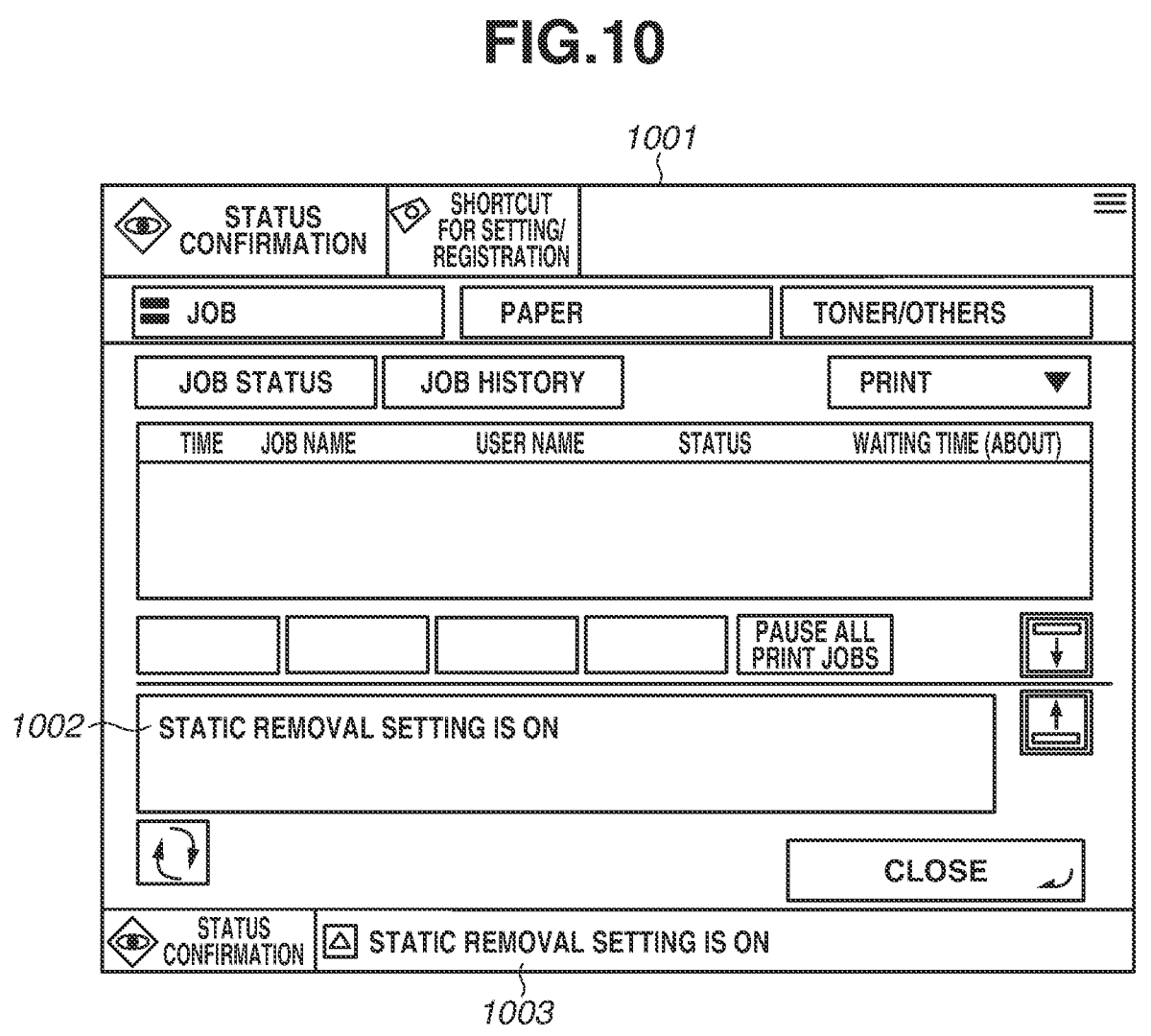

| ◈ STATUS CONFIRMATION | ◇ SHORTCUT FOR SETTING/ REGISTRATION | | ☰ |
|---|---|---|---|

| ☰ JOB | PAPER | TONER/OTHERS |
|---|---|---|

| JOB STATUS | JOB HISTORY | PRINT ▼ |
|---|---|---|

| TIME | JOB NAME | USER NAME | STATUS | WAITING TIME (ABOUT) |
|---|---|---|---|---|

| | | | | PAUSE ALL PRINT JOBS | ↓ |
|---|---|---|---|---|---|

*1002* → STATIC REMOVAL SETTING IS ON    ↑

↻    CLOSE ⤶

| ◈ STATUS CONFIRMATION | △ STATIC REMOVAL SETTING IS ON |
|---|---|

*1003*

PRINTING SYSTEM INCLUDING A STATIC-CONTROL APPARATUS, CONTROL METHOD THEREOF, AND STORAGE MEDIUM

BACKGROUND

Field of the Disclosure

The present disclosure relates to a printing apparatus, a control method thereof, and a storage medium.

Description of the Related Art

Sheets for use in printing work are conveyed in a state where the sheets are charged with static electricity due to residual charge in the course of an electrophotographic process or due to slight friction with a conveyance roller and a guide during sheet conveyance. Due to the static electricity, the sheets may stick to each other. The attachment of dust and paper powder to the printed matter would deteriorate the quality of the printed matter.

Sheets of plain paper or the like are low in electrical resistance, and electrical charge is likely to move on the sheets. Thus, the electrical charge on the sheets is small in amount and is eliminated quickly. On the other hand, sheets made of synthetic resin (plastic) such as cardboards, synthetic paper, and coated paper are high in electrical resistance and charge movement is unlikely to occur on the sheets. As a result, the sheets made of synthetic paper and coated paper tend to be electrically charged and have residual electrical charge. These sheets are generally known to be vulnerable to environmental factors, in particular, moisture, and known to be easily charged with static electricity, due to the fact that the amount of discharge to the air decreases in a lower-moisture environment.

If the sheets sticking to each other are subjected to post-processing, the sheet registration may be affected to deteriorate the quality of the post-processing. Moreover, paper jams may be induced by defective paper feeding or defective conveyance at the time of the post-processing, which may cause damage to the sheets and the devices.

In order to prevent the occurrence of such failures, it is desired to remove static electricity from the sheets having undergone the printing process, before execution of the post-processing. Japanese Patent Application Laid-Open No. 11-258881 proposes a method for canceling out electrical charge accumulated on sheets by applying a voltage to a conveyance roller pair positioned downstream in a sheet conveyance direction.

The removal of static electricity by a configuration in which a voltage is applied to a conveyance roller (hereinafter, called "static removal roller") is performed by applying charge opposite to the charge accumulated on the sheets to the sheets via the static removal roller to cancel out the accumulated static electricity. Thus, the control of static removal by the static removal roller (application of charge opposite to the charge on the sheets to the static removal roller) needs to be performed in accordance with the amount of electrical charge on the sheets. That is, it is necessary to adjust electrical charge for optimum static removal to each printing environmental factor such as moisture and each brand of paper.

If the sheets are subjected to static removal control in a state where electrical charge is improperly adjusted, the sheets may be charged with static electricity as an adverse result, which may lead to further sticking of the sheets.

SUMMARY

A printing apparatus includes a printer unit configured to print an image on a sheet, a conveyance unit configured to convey the sheet on which the image is printed by the printer unit to a static removal apparatus configured to perform a static removal process on the sheet, and a display unit configured to display a state of a setting of the static removal process performed by the static removal apparatus.

Further features of various embodiments of the present disclosure will become apparent from the following description of exemplary embodiments with reference to the attached drawings.

BRIEF DESCRIPTION OF THE DRAWINGS

FIG. 3 is a cross-sectional structure view of the printing system according to the exemplary embodiment.

FIG. 7 is a diagram schematically describing a static removal process according to the exemplary embodiment.

FIG. 8 is a flowchart of a process in the printing system according to the exemplary embodiment.

FIG. 10 is a diagram illustrating a status confirmation screen according to the exemplary embodiment.

DESCRIPTION OF THE EMBODIMENT

Exemplary embodiments for carrying out the present disclosure will be described in detail with reference to the drawings. However, constituent elements to be described in relation to the exemplary embodiments are mere examples and are not intended to limit the scope of every embodiment of the present disclosure thereto.

<Overall Configuration of Printing System>

Figure 1:
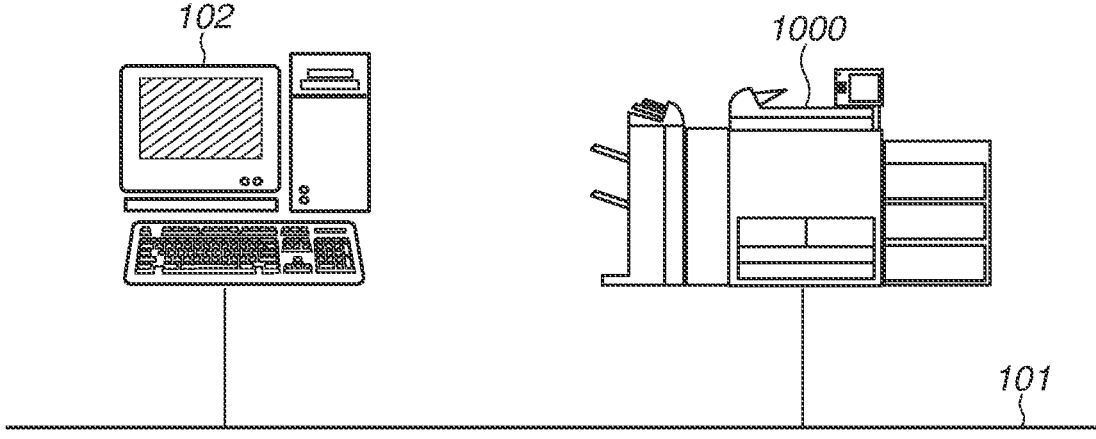
FIG. 1 is an overall configuration diagram of a printing system according to an exemplary embodiment.

A first exemplary embodiment will be described. FIG. 1 illustrates an overall configuration of the present exemplary embodiment, which includes a printing system 1000 and a client computer 102 (hereinafter, called "PC") that are connected together via a network 101. The PC 102 can transmit page description language (PDL) code data that is a print job to the printing system 1000 via the network 101.

<Hardware Configuration of Printing Apparatus>

Figure 2:
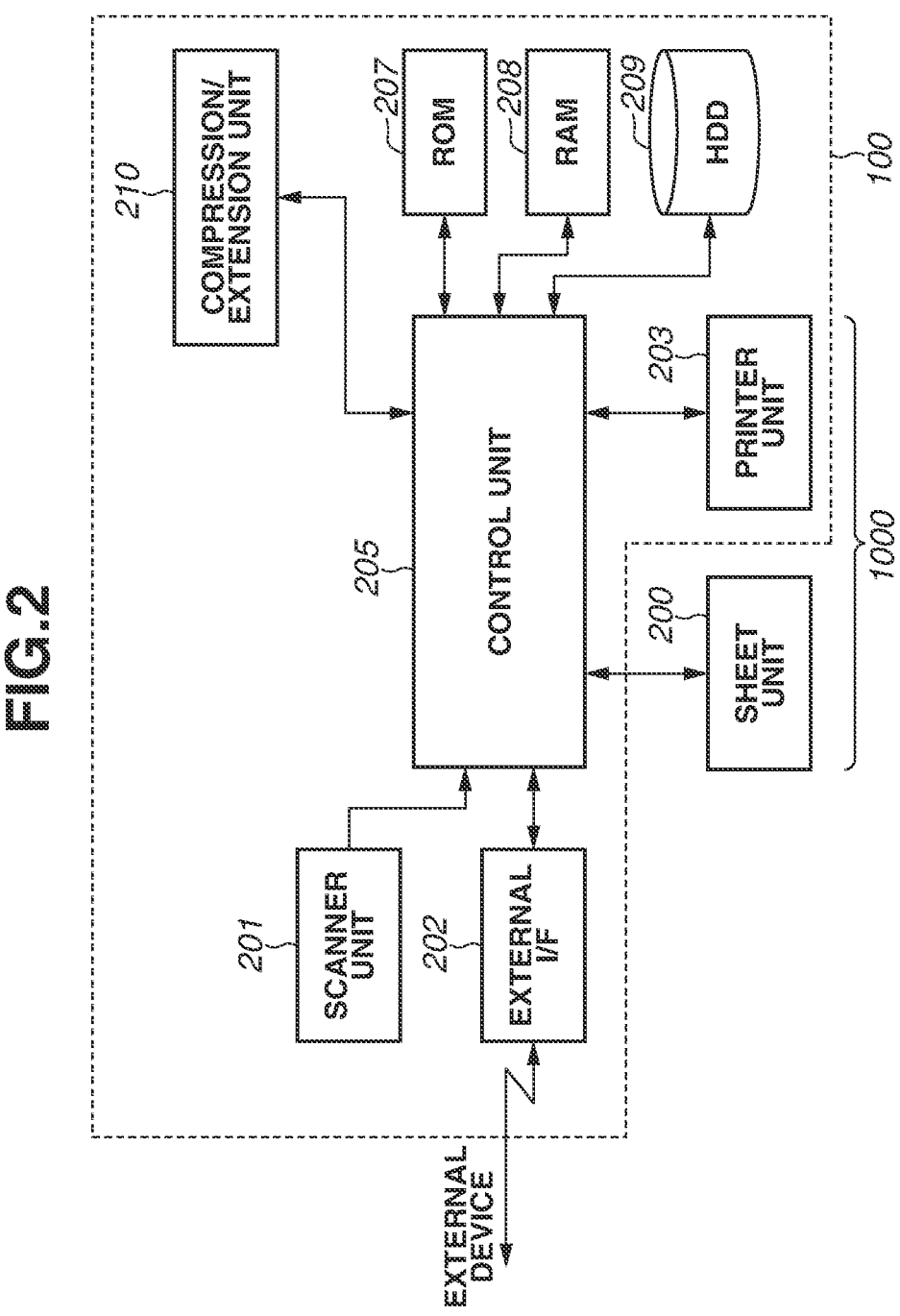
FIG. 2 is a hardware configuration diagram of a printing apparatus according to the exemplary embodiment.

A hardware configuration of the printing system 1000 will be described with reference to the system block diagram of FIG. 2.

The printing system 1000 includes a printing apparatus 100 illustrated in a dotted frame in the drawing, and a sheet processing apparatus 200. An arbitrary number of sheet processing apparatuses 200 can be connected to the printing apparatus 100. In the present exemplary embodiment, a multi-function peripheral (MFP) that is a composite machine having a plurality of functions, such as a copy function and a printer function, is taken as an example of the printing apparatus 100. The printing apparatus 100 may be a single-function printing apparatus having only a copy function or a printer function. In the present exemplary embodiment, as an example, the printing system 1000 includes various constituent elements to be described below.

The printing system 1000 is configured such that sheet processing on the sheets printed by the printing apparatus 100 can be executed by the sheet processing apparatus 200 connected to the printing apparatus 100. However, the printing system 1000 may be constructed of only the printing apparatus 100 without being connected to the sheet processing apparatus 200.

The sheet processing apparatus 200 is communicable with the printing apparatus 100, and can execute sheet processing as described below in response to an instruction from the printing apparatus 100.

A scanner unit 201 reads an image on a document, converts the read image into image data, and transfers the image data to another unit.

An external interface (I/F) 202 transmits and receives data to and from other apparatuses connected to the network 101.

A printer unit 203 prints an image based on the input image data on a sheet.

Figure 4:
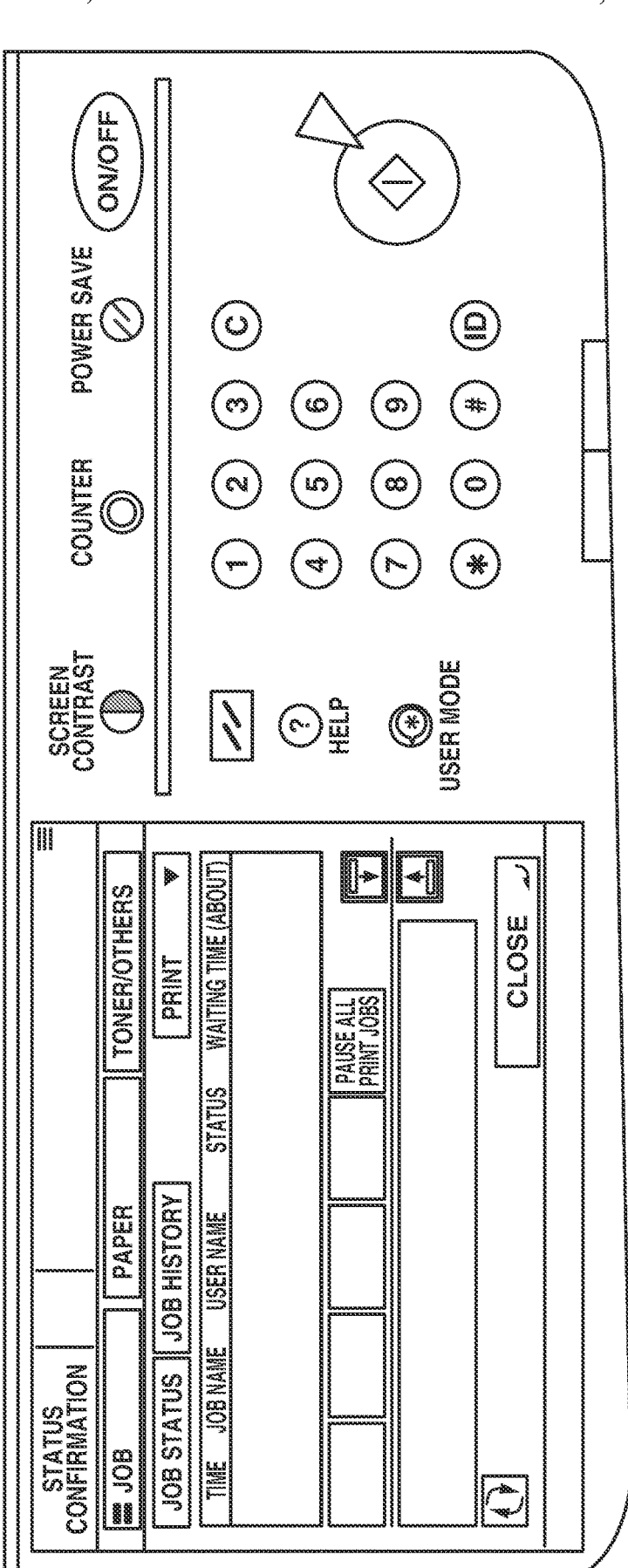
FIG. 4 is a diagram illustrating an operation unit in the printing apparatus according to the exemplary embodiment.

An operation unit 204 is configured as illustrated in FIG. 4, includes a hard key input unit 402 and a touch panel unit 401, and receives instructions from the user via these units. The operation unit 204 provides various types of displays on the touch panel unit 401 included in the operation unit 204.

A control unit 205 is a central processing unit (CPU), and comprehensively controls processing and operations of the various units included in the printing system 1000. That is, the control unit 205 also controls operations of the printing apparatus 100 and the sheet processing apparatus 200 connected to the printing apparatus 100.

A read only memory (ROM) 207 stores various computer programs to be executed by the control unit 205.

For example, the ROM 207 stores programs for causing the control unit 205 to execute various types of processing in the flowcharts to be described below and display control programs necessary for displaying various setting screens to be described below. The ROM 207 also stores programs for the control unit 205 to interpret PDL code data received from the PC 102 and execute an operation of developing the PDL code data into raster image data. Moreover, the ROM 207 stores a boot sequence, font information, and the like.

A random access memory (RAM) 208 stores image data and PDL code data transmitted from the scanner unit 201 and the external I/F 202, various programs loaded from the ROM 207, and setting information. The RAM 208 stores information related to the sheet processing apparatuses 200 (information on the types and functions of the sheet processing apparatuses 200 connected to the printing apparatus 100). The control unit 205 uses the information related to the sheet processing apparatuses 200 stored in the RAM 208 for control.

A hard disk drive (HDD) 209 includes a hard disk and a driving unit that reads and writes data from and to the hard disk. The HDD 209 is a large-capacity storage device that stores image data input by the scanner unit 201 and compressed by a compression/extension unit 210.

The control unit 205 can control the printer unit 203 to print the image data stored in the HDD 209 in response to an instruction from the user. The HDD 209 is also used as a spooler, and the control unit 205 can manage the PDL code data received from the PC 102 as print jobs and stores the print jobs in the HDD 209. The control unit 205 can manage the print jobs stored in the HDD 209, and acquire the number of print jobs stored and setting information made to the print jobs.

The compression/extension unit 210 performs compression/extension on the image data stored in the RAM 208 or the HDD 209 by various compression methods, such as JBIG and JPEG.

<Configuration of Printing System>

Figure 3:
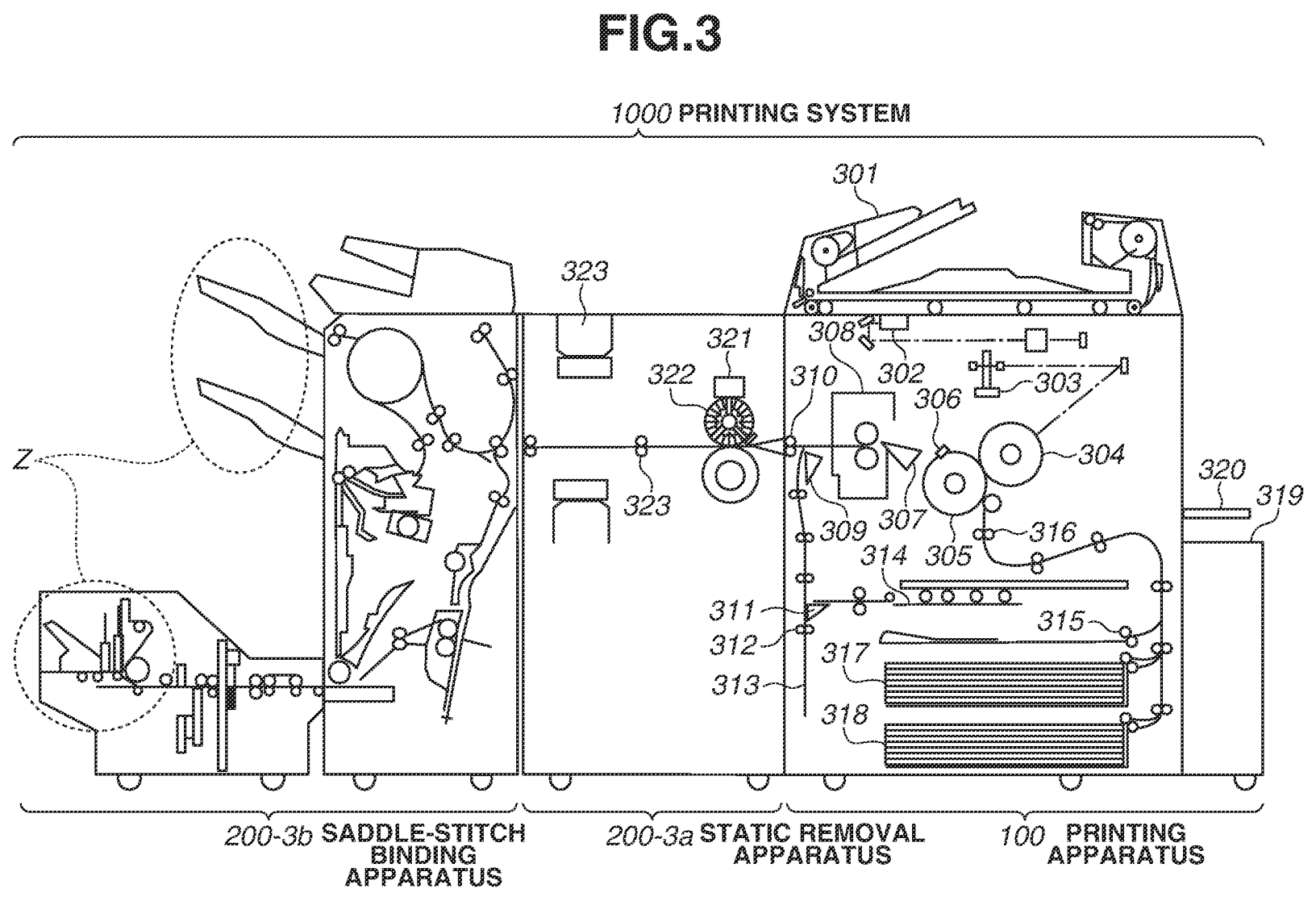

A configuration of the printing system 1000 will be described with reference to FIG. 3. FIG. 3 is a cross-sectional view of the printing apparatus 100 and the sheet processing apparatus 200 connected to the printing apparatus 100. In the present exemplary embodiment, the sheet processing apparatus 200 includes a static removal apparatus 200-3*a* and a saddle-stitch binding apparatus 200-3*b*.

(Printing Apparatus)

The printing apparatus 100 will be described.

An automatic document feeder (ADF) 301 separates a bundle of documents set on the placement surface of the document tray in order from the first page, and conveys the documents onto the platen glass for scanning by a scanner 302.

The scanner 302 reads the image in the document having been conveyed onto the platen glass and converts the image into image data by a charge-coupled device (CCD).

A ray of light, such as laser light, for example, which has been modulated in accordance with the image data, is incident on a rotary polygon mirror 303, and a photoconductive drum 304 is irradiated with the ray of light as reflective scanning light via a reflective mirror.

A latent image formed of the laser light on the photoconductive drum 304 is developed by toner, and the toner image is transferred onto a sheet attached to a transfer drum 305. This series of operations in the image formation process is executed with toner of yellow (Y), magenta (M), cyan (C), and black (K) in sequence to form a full-color image. After the four iterations of the image formation process, the sheet with the full-color image on the transfer drum 305 is separated from the transfer drum 305 by a separation claw 306 and conveyed by a pre-fixing conveyor 307 to a fixing unit 308.

The fixing unit 308 includes a combination of rollers and a belt, contains a heat source, such as a halogen heater, and melts and fixes the toner with heat and pressure on the sheet having the toner image transferred thereto.

A discharge flapper 309 is capable of swinging around a swing shaft, and defines the conveyance direction of the sheet. When the discharge flapper 309 swings in the clockwise direction illustrated in the drawing, the sheet is conveyed straight and discharged by a discharge roller 310 to the outside of the apparatus.

The control unit 205 controls the printing apparatus 100 to execute single-sided printing in the above-described sequence.

On the other hand, in a case where an image is to be formed on both sides of the sheet, the discharge flapper 309 swings in the counterclockwise direction illustrated in the drawing so that the conveyance path of the sheet is changed downward and the sheet is fed to a double-side conveyance unit.

The double-side conveyance unit includes a reversal flapper 311, reversal rollers 312, a reversal guide 313, and a double-side tray 314.

The reversal flapper 311 swings around the swing shaft to define the conveyance direction of the sheet. In a case where a double-side print job is to be processed, the control unit 205 controls the reversal flapper 311 to swing in the counterclockwise direction illustrated in the drawing to feed the sheet with a first side printed by the printer unit 203 to the reversal guide 313 via the reversal rollers 312. With the rear end of the sheet sandwiched between the reversal rollers 312, the control unit 205 temporarily stops the reversal rollers 312 so that the reversal flapper 311 continues to swing in the clockwise direction illustrated in the drawing. In addition, the control unit 205 causes the reversal rollers 312 to rotate in the opposite direction. Accordingly, the sheet is switched back, and then is conveyed with the rear end and the front end transposed and guided to the double-side tray 314. The sheet is placed once on the double-side tray 314 and then the sheet is fed again by a re-feed roller 315 to a registration roller 316. At this time, the sheet is fed such that the side opposite to the first side processed in the transfer process faces the photoconductive drum 304. In a manner similar to the above-described process, the second image is formed on the second side of the sheet. After the images are formed on both sides of the sheet and the sheet undergoes the fixing process, the sheet is discharged via the discharge roller 310 from the inside to outside of the printing apparatus 100. In the above-described sequence, the control unit 205 controls the printing apparatus 100 to execute double-side printing.

The printing apparatus 100 has paper feed units that hold the sheets necessary for the printing process. The paper feed units are paper feed cassettes 317 and 318 (that each can accommodate 500 sheets, for example), a paper feed deck 319 (that can accommodate 5000 sheets, for example), a manual feeding tray 320, and the like. Various types of sheets different in size and material can be set in the paper feed cassettes 317 and 318 and the paper feed deck 319, as paper feed units, separately on a type-by-type basis. Various types of sheets including special sheets, such as overhead projector (OHP) sheets, can be set on the manual feeding tray 320.

(Static Removal Apparatus)

Figure 5:
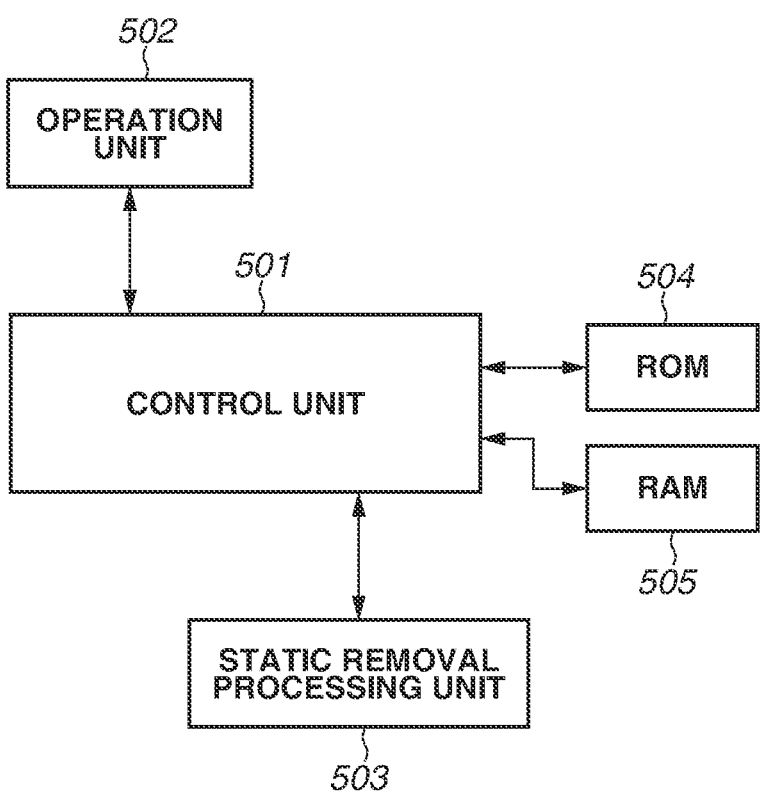
FIG. 5 is a hardware configuration diagram of a static removal apparatus according to the exemplary embodiment.

The static removal apparatus 200-3a will be described. FIG. 5 is a block diagram illustrating a hardware configuration of the static removal apparatus 200-3a. The static removal apparatus 200-3a also has a control unit 501 different from that of the printing apparatus 100. The control unit 501 comprehensively controls the entire static removal apparatus 200-3a while communicating with the control unit 205 of the printing apparatus 100 illustrated in FIG. 2 via a bus (not illustrated).

Figure 6:
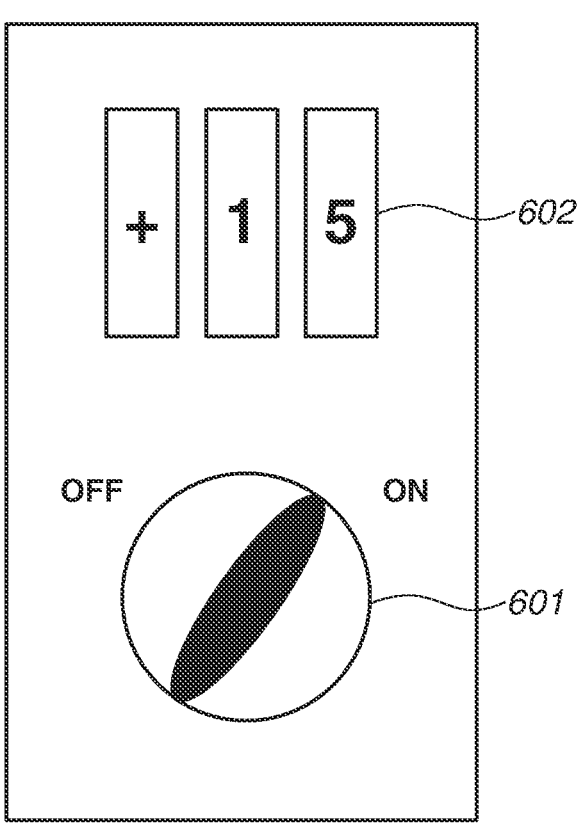
FIG. 6 is a diagram illustrating an operation unit in the static removal apparatus according to the exemplary embodiment.

FIG. 6 illustrates a configuration of an operation unit 502.

The user can make settings in the static removal apparatus 200-3a via the operation unit 502.

A mode setting switch 601 is turned on or off to switch the static removal performed by the static removal apparatus 200-3a between execution or inexecution (ON/OFF). Only when the switch is ON, the control unit 501 controls a static removal processing unit 503 to be described below to execute the static removal process.

An adjustment dial 602 includes a thumb rotary switch and adjusts the intensity of the static removal control that is performed when the mode setting switch 601 is ON. The control unit 501 controls the adjustment dial 602 so as to be activated only when the mode setting switch 601 is ON.

The static removal processing unit 503 includes a static removal roller 322 to be described below, an ionizer 323, and a voltage application controller 321 for the roller and the ionizer, and performs the static removal process on the conveyed sheet.

The control unit 501 implements a control of applying a voltage to the static removal roller 322 and the ionizer 323 via the voltage application controller 321.

The ROM 504 stores a boot program for the static removal apparatus 200-3a, a control program for the control unit 205, a static removal processing program for the static removal processing unit 503, and others. The control unit 501 loads a necessary program from the ROM 504 to the RAM 505 and executes the loaded program.

[Static Removal Process]

The static removal process performed by the static removal processing unit 503 will be described with reference to FIG. 7. FIG. 7 is a diagram schematically illustrating a state where the static removal apparatus 200-3a performs the static removal process on the sheet having undergone the printing process in the printing apparatus 100.

A sheet 701 is conveyed through the operation unit 502 to a development and transfer unit including the photoconductive drum 304 and the transfer drum 305, and toner is placed on the sheet 701. Charged toner 702 on the sheet 701 is negatively charged. The sheet 701 having undergone fixing through the fixing unit 308 is conveyed to the static removal apparatus 200-3a with a printed side 703 negatively charged. The static removal apparatus 200-3a includes the static removal roller 322 positively charged, and applies positive charge by the roller to the negatively charged printed side 703 to eliminate the charged state. However, it is assumed that the negative charge or the positive charge due to opposite charging having not been removed through the static removal process by the static removal roller 322 may remain on a sheet 705 after the sheet has passed through the static removal roller 322. Thus, the static removal apparatus 200-3a in the present exemplary embodiment includes the ionizer 323 downstream of the static removal roller 322. The ionizer 323 is a device that generates corona discharge by applying a voltage to an electrode needle included therein and uses resultant ions to eliminate the charged state. In this manner, when rough static removal is performed by the static removal roller 322 and the residual charge is treated by the ionizer, the charged state is eliminated from a sheet 707 having undergone the static removal process and been discharged from the static removal apparatus 200-3a.

Referring back to the cross-sectional view of FIG. 3, the static removal apparatus 200-3a has the static removal roller 322 and a roller paired with the static removal roller 322. The sheet having been conveyed by the static removal apparatus 200-3a is then sandwiched between and conveyed by both of the rollers, and is subjected to rough static removal by the static removal roller 322 described above. After that, the sheet is subjected to the residual charge removal process by the ionizer 323 while being conveyed to the outside of the apparatus.

(Saddle-Stich Binding Apparatus)

A saddle-stich binding apparatus 200-3b will be described with reference to FIG. 3. Sheet processing performed by the saddle-stich binding apparatus 200-3b includes saddle-stitch binding, punching, cutting, shift paper discharge, folding, and stapling, for example. These jobs will be called "saddle-stich binding jobs".

In the case of performing the saddle-stich binding jobs, the control unit 205 causes the sheet having been printed by the printing apparatus 100 to be conveyed to the saddle-stich binding apparatus 200-3b, and then the control unit 205 causes the saddle-stich binding apparatus 200-3b to execute the job sheet processing. The control unit 205 causes the printed matter having undergone the saddle-stich binding jobs by the saddle-stich binding apparatus 200-3*b* to be held at a discharge destination Z in the saddle-stich binding apparatus 200-3*b*. For the discharge destination Z, there is a plurality of discharge destination options. This is because the saddle-stich binding apparatus 200-3*b* can execute a plurality of types of sheet processing and discharge the sheets to different discharge destinations depending on sheet processing. In the present exemplary embodiment, description of a detailed conveyance procedure of the binding jobs will be omitted.

<Printing Process>

The processing in the printing system will be described with reference to the flowchart in FIG. 8.

The steps in the flowchart in FIG. 8 are implemented by the control unit 205 reading a program stored in the ROM 207 or the HDD 209 to the RAM 208 and executing the read program.

In step S801, the control unit 205 of the printing apparatus 100 acquires the setting state (ON or OFF) of the static removal process in the static removal apparatus 200-3*a*. This step is implemented by the control unit 501 of the static removal apparatus 200-3*a* acquiring the state of the mode setting switch 601 of the operation unit 502 in the static removal apparatus 200-3*a* in response to an inquiry from the control unit 205 of the printing apparatus 100 and making a reply to the control unit 205 of the printing apparatus 100.

In step S802, the control unit 205 of the printing apparatus 100 displays the setting state (ON/OFF) of the static removal process in the static removal apparatus 200-3*a* acquired in step S801, on the operation unit 204 of the printing apparatus 100. Specifically, in a case where the setting state of the static removal process in the static removal apparatus 200-3*a* acquired in step S801 is ON, the control unit 205 of the printing apparatus 100 causes the operation unit 204 to display that the setting of the static removal process in the static removal apparatus 200-3*a* is ON (activated). On the other hand, in a case where the setting state of the static removal process in the static removal apparatus 200-3*a* acquired in step S801 is OFF, the control unit 205 of the printing apparatus 100 causes the operation unit 204 to display that the setting of the static removal process is OFF (deactivated). FIG. 10 illustrates a status confirmation screen 1001 on which the user is notified of the system state of the printing system 1000. In the example of FIG. 10, the display on the status confirmation screen 1001 indicates that the setting state of the static removal process is ON. An area 1002 is an area where, among events having occurred in the printing system 1000, an event of which the user is to be notified is displayed. A plurality of events can be listed and displayed in the area 1002. An area 1003 is defined as similar to the area 1002, but is always displayed even after transition to other screens. In the area 1003, only one event can be displayed, and if a plurality of events has occurred, the plurality of events is displayed in a toggle form. On these screens, the printing system 1000 can notify the user of whether the setting state of the static removal process in the static removal apparatus 200-3*a* is ON or OFF.

In step S803, the control unit 205 of the printing apparatus 100 determines whether a print job has been submitted. In a case where no print job has been submitted (NO in step S803), the process returns to step S801. In step S801, the setting state (ON/OFF) of the static removal process continues to be displayed. On the other hand, in a case where a print job has been submitted (YES in step S803), the process proceeds to step S804.

In step S804, the control unit 205 of the printing apparatus 100 interprets the settings of the print job and specifies the sheet for use in printing.

In step S805, the control unit 205 determines whether the print job needs to confirm the start of printing with the user. (Determination Process on Need to Confirm Print Strat with User)

Figure 9:
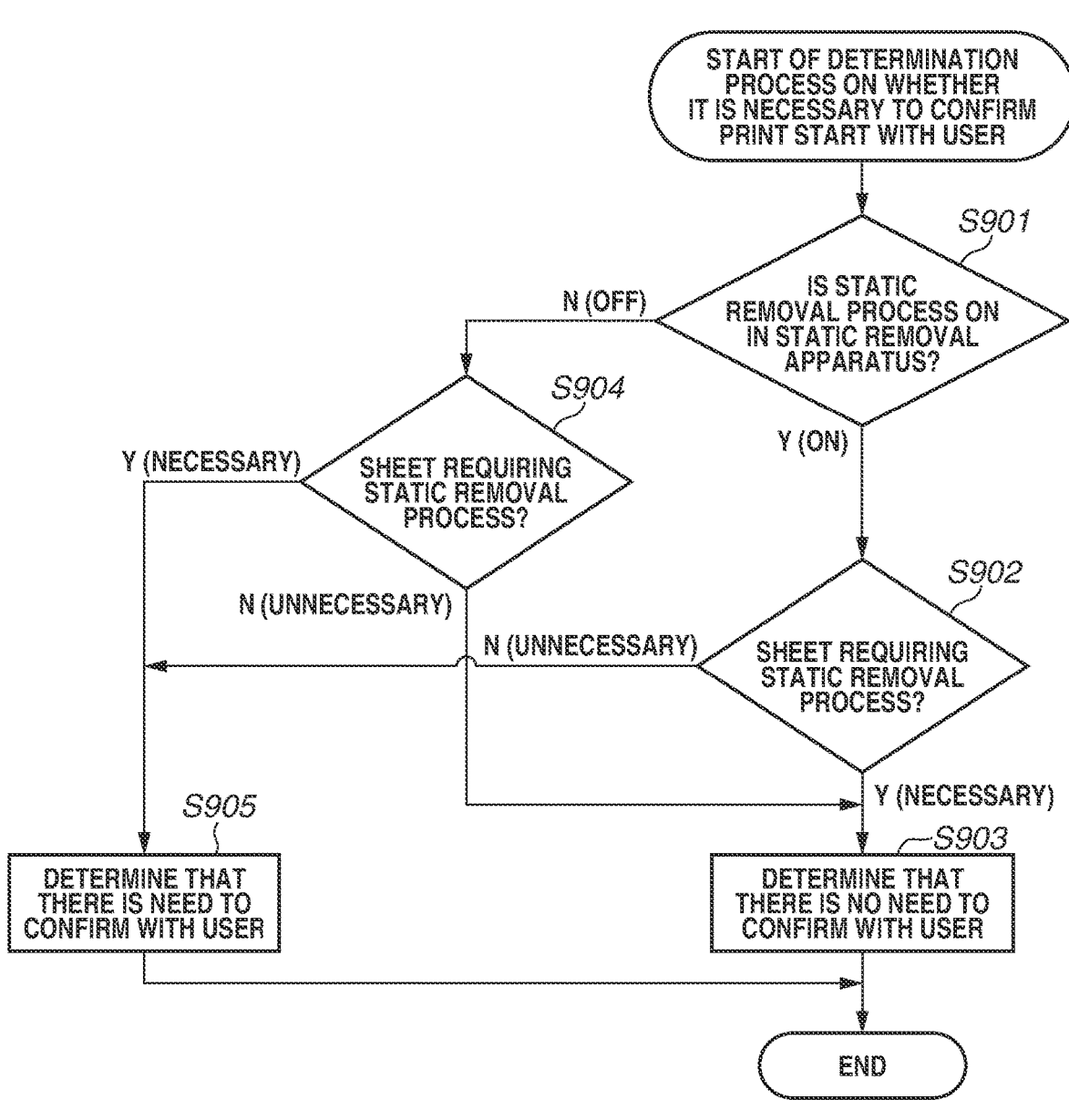
FIG. 9 is a flowchart of determination on whether to ask a user about start of printing according to the exemplary embodiment.

Step S805 will be described with reference to the flowchart in FIG. 9. The steps in the flowchart in FIG. 9 are implemented by the control unit 205 reading a program stored in the ROM 207 or the HDD 209 to the RAM 208 and executing the read program. Step S805 is a process for avoiding inexecution of the static removal process on a sheet requiring the static removal process or improper execution of the static removal process on a sheet not requiring the static removal process.

In step S901, the control unit 205 of the printing apparatus 100 ascertains the setting state (ON/OFF) of the static removal process acquired in step S801. In a case where the control unit 205 determines that the setting state of the static removal process is ON (YES in step S901), the process proceeds to step S902.

In step S902, the control unit 205 determines whether the sheet specified in step S804 requires the static removal process. In a case where the control unit 205 determines that the sheet specified in step S804 requires the static removal process (YES in step S902), the process proceeds to step S903.

In step S903, because the printing can be continued without any problem, the control unit 205 of the printing apparatus 100 determines that there is no need to confirm with the user, and the determination process is ended.

On the other hand, in a case where the control unit 205 determines that the sheet does not require the static removal process (NO in step S902), the process proceeds to step S905.

In step S905, because performing the static removal process on the sheet not requiring the static removal process may adversely lead to charging and cause electrostatic adsorption on the printed matter, the control unit 205 of the printing apparatus 100 determines that there is the need to confirm with the user, and the determination process is ended.

In a case where the control unit 205 determines in step S901 that the setting state of the static removal process is OFF (NO in step S901), the process proceeds to step S904.

In step S904, the control unit 205 of the printing apparatus 100 determines whether the sheet specified in step S804 requires the static removal process. In a case where the control unit 205 determines in step S904 that the sheet does not require the static removal process (NO in step S904), the process proceeds to step S903.

In step S903, because the printing can be continued without any problem, the control unit 205 of the printing apparatus 100 determines that there is no need to confirm with the user, and the determination process is ended.

In a case where the control unit 205 determines that the sheet requires the static removal process in the printing apparatus 100 (YES in step S904), the process proceeds to step S905.

In step S905, because the sheet requiring the static removal process may be discharged without being subjected to the static removal process, the control unit 205 of the printing apparatus 100 determines that there is the need to confirm with the user, and the determination process is ended.

In this manner, the control unit 205 of the printing apparatus 100 determines the need to confirm with the user. The list of sheet types requiring the static removal process in the printing apparatus 100 is prescribed as a design matter and is held in the HDD 209. The determination on whether the static removal process is required on the sheet in steps S902 and S904 is implemented by the control unit 205 of the printing apparatus 100 with reference to the list.

Description will be continued referring back to the flow-chart in FIG. 8.

In step S806, the control unit 205 of the printing apparatus 100 refers to the result in step S805 to determine whether confirming the continuance of printing with the user was concluded to be necessary or unnecessary. In a case where the control unit 205 determines in step S806 that confirming the continuance of printing with the user is not necessary (NO in step S806), the process proceeds to step S809. In step S809, the control unit 205 of the printing apparatus 100 performs the printing process. On the other hand, in a case where the control unit 205 determines in step S806 that confirming the continuance of printing with the user is necessary (YES in step S806), the process proceeds to step S807.

Figure 11:
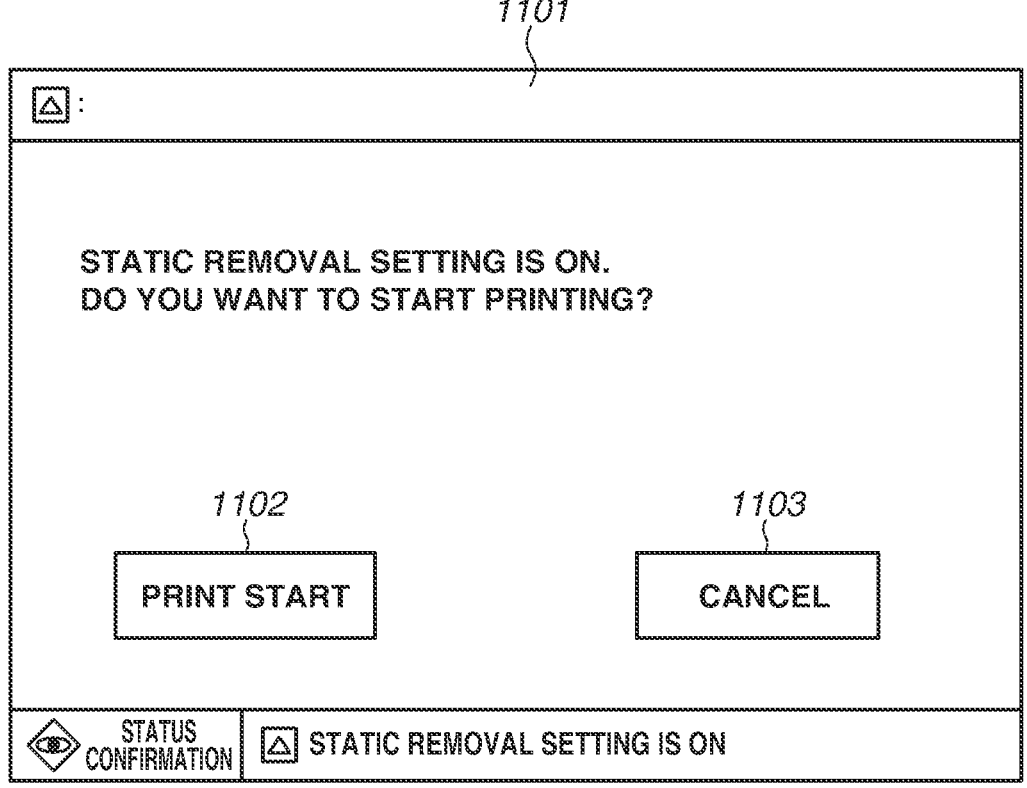
FIG. 11 is a diagram illustrating a print start confirmation screen according to the exemplary embodiment.

In step S807, the control unit 205 of the printing apparatus 100 temporarily pauses the start of the print job, and displays a screen 1101 as exemplified in FIG. 11 on the operation unit 204 of the printing apparatus 100 to confirm the start of printing with the user. FIG. 11 illustrates a screen example to be displayed if there is a possibility that the static removal process may be performed on the sheet not requiring the static removal process (NO in step S902). The user presses [Print Start] button 1102 in order to confirm continuance of the temporarily paused printing, or instruct for continuance of the temporarily paused printing after turning the static removal process of the static removal apparatus 200-3a to ON. The user presses [Cancel] button 1103 in order to cancel the printing once.

In step S808, the control unit 205 determines whether the [Print Start] button 1102 on the print start confirmation screen 1101 illustrated in FIG. 11 has been pressed. In a case where the control unit 205 determines that the [Print Start] button 1102 has been pressed (YES in step S808), the process proceeds to step S809. In step S809, the control unit 205 executes the printing. On the other hand, in a case where the control unit 205 determines that [Cancel] button 1103 has been pressed (NO in step S808), the control unit 205 of the printing apparatus 100 cancels the print job in response to the instruction, and the process is ended without any processing.

In step S809, the control unit 205 of the printing apparatus 100 causes the printer unit 203 to execute the printing in response to the instruction, and the process is ended.

In this manner, controlling the printing system 1000 including the static removal apparatus 200-3a makes it possible to appropriately perform static removal in accordance with the type of the sheet for use in printing.

In the exemplary embodiment described above, the control unit 205 of the printing apparatus 100 displays the setting state (ON/OFF) of the static removal process in the static removal apparatus 200-3a acquired in step S801 on the operation unit 204 of the printing apparatus 100 as an example. However, some embodiments of the present disclosure are not limited to this example. The control unit 205 may notify an external device (personal computer or mobile terminal) of the setting state (ON/OFF) of the static removal process in the static removal apparatus 200-3a acquired in step S801, and display the setting state on the display unit of the external device.

The disclosure of the present exemplary embodiment includes the following configurations, method, and program.

(Configuration 1)

A printing system including a printer unit that executes a printing process on a sheet for use in a print job, a static removal unit that performs a static removal process on the sheet printed by the printer unit, and an operation unit, wherein the printing system further includes a display unit that displays the setting state of the static removal process in the static removal unit on the operation unit, and a confirmation unit that displays on the operation unit a screen for confirming continuance of printing with a user based on necessity of the static removal process on the sheet for use in the print job and the setting state of the static removal process in the static removal unit.

(Configuration 2)

The printing system according to configuration 1, wherein the confirmation unit temporarily pauses the print job and displays the screen for confirming the continuance of printing with the user on the operation unit, if the sheet for use in the print job is a sheet not requiring the static removal process and the setting state of the static removal process is ON.

(Configuration 3)

The printing system according to configuration 1 or 2, wherein the confirmation unit temporarily pauses the print job and displays the screen for confirming the continuance of printing with the user on the operation unit, if the sheet for use in the print job is a sheet requiring the static removal process and the setting state of the static removal process is OFF.

(Configuration 4)

The printing system according to any one of configurations 1 to 3, wherein the printer unit executes printing if the user instructs start of the printing via the screen.

(Configuration 5)

The printing system according to any one of configurations 1 to 4, wherein the static removal unit is a static removal roller and/or an ionizer.

(Method 1)

A control method of a printing system, the printing system including a printer unit that executes a printing process on a sheet for use in a print job, a static removal unit that performs a static removal process on the sheet printed by the printer unit, and an operation unit, wherein the control method includes displaying the setting state of the static removal process in the static removal unit on the operation unit, and displaying on the operation unit a screen for confirming continuance of printing with a user based on necessity of the static removal process on the sheet for use in the print job and the setting state of the static removal process in the static removal unit.

(Program 1)

A program for causing a computer to execute the control method of a printing system according to method 1.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the func- tions of one or more of the above-described embodiment(s), and by a method performed by the computer of the system or apparatus by, for example, reading out and executing the computer-executable instructions from the storage medium to perform the functions of one or more of the above- described embodiment(s) and/or controlling the one or more circuits to perform the functions of one or more of the above-described embodiment(s). The computer may com- prise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed comput- ing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifi- cations and equivalent structures and functions.

This application claims priority to Japanese Patent Appli- cation No. 2023-012577, which was filed on Jan. 31, 2023 and which is hereby incorporated by reference herein in its entirety.

What is claimed is:

1. A printing apparatus comprising:
a printer that prints an image on a sheet;
a conveyer that conveys the sheet on which the image is printed by the printer to a static electricity removal apparatus configured to perform a static electricity removal process on the sheet, the static electricity removal apparatus being different from the printing apparatus, the static electricity removal apparatus hav- ing a setting part receiving a setting of the static electricity removal process;
a storage that stores a list of sheet types requiring the static electricity removal process; and
one or more processors that obtain the setting of the setting part from the static electricity removal appara- tus,
wherein the one or more processors are configured to:
notify a user when a type of the sheet is in the list of sheet types requiring the static electricity removal process and the obtained setting indicates that the static electricity removal process is OFF;
notify the user when the type of the sheet is not in the list of sheet types requiring the static electricity removal process and the obtained setting indicates that the static electricity removal process is ON;
cause the printer to print the image without issuing the notification when the type of the sheet is in the list of sheet types requiring the static electricity removal process and the obtained setting indicates that the static electricity removal process is ON;
cause the printer to print the image without issuing the notification when the type of the sheet is not in the list of sheet types requiring the static electricity removal process and the obtained setting indicates that the static electricity removal process is OFF; and execute printing of the image in response to an operation on a notification screen displayed by the notification.

2. The printing apparatus according to claim 1, further comprising a display that displays a state of the setting of the setting part,
wherein the display provides a display indicating whether the setting of the setting part is ON or OFF.

3. The printing apparatus according to claim 2,
wherein the display displays the state of the setting of the setting part based on the setting acquired by the one or more processors.

4. The printing apparatus according to claim 2, further comprising an interface configured to receive a job of printing the image on the sheet,
wherein after the interface receives the job, the display provides a predetermined display in a case where the sheet is a sheet not requiring the static electricity removal process and the setting of the setting part is ON.

5. The printing apparatus according to claim 4, wherein after the display provides the predetermined display, the printer prints the image on the sheet upon receipt of a print start instruction from a user.

6. The printing apparatus according to claim 2, further comprising an interface configured to receive a job of printing the image on the sheet,
wherein after the interface receives the job, the display provides a predetermined display in a case where the sheet is a sheet requiring the static electricity removal process and the setting of the setting part is OFF.

7. The printing apparatus according to claim 6, wherein after the display provides the predetermined display, the printer prints the image on the sheet upon receipt of a print start instruction from a user.

8. The printing apparatus according to claim 1, wherein the static electricity removal process is performed by a static electricity removal roller.

9. The printing apparatus according to claim 1, wherein in a case where the operation on the notification screen indi- cates cancellation, the one or more processors cancel the printing of the image.

10. A control method for controlling a printing apparatus, the control method comprising:
printing an image on a sheet;
conveying the sheet on which the image is printed in the printing to a static electricity removal apparatus con- figured to perform a static electricity removal process on the sheet, the static electricity removal apparatus being different from the printing apparatus, the static electricity removal apparatus having a setting part receiving a setting of the static electricity removal process;
a storage that stores a list of sheet types requiring the static electricity removal process; and
obtaining the setting of the setting part from the static electricity removal apparatus;
wherein the control method further comprises steps of:
notifying a user when a type of the sheet is in the list of sheet types requiring the static electricity removal process and the obtained setting indicates that the static electricity removal process is OFF;
notifying the user when the type of the sheet is not in the list of sheet types requiring the static electricity removal process and the obtained setting indicates that the static electricity removal process is ON;
causing the printer to print the image without issuing the notification when the type of the sheet is in the list of sheet types requiring the static electricity removal process and the obtained setting indicates that the static electricity removal process is ON;

causing the printer to print the image without issuing the notification when the type of the sheet is not in the list of sheet types requiring the static electricity removal process and the obtained setting indicates that the static electricity removal process is OFF; and executing printing of the image in response to an operation on a notification screen displayed by the notification.

11. A non-transitory computer-readable storage medium storing a program for causing a computer to execute a control method for controlling a printing apparatus, the control method comprising:

printing an image on a sheet;

conveying the sheet on which the image is printed in the printing to a static electricity removal apparatus configured to perform a static electricity removal process on the sheet, the static electricity removal apparatus being different from the printing apparatus, the static electricity removal apparatus having a setting switch receiving the setting of the static electricity removal process;

storing a list of sheet types requiring the static electricity removal process; and

obtaining the setting of the setting switch from the static electricity removal apparatus;

wherein the control method further comprises steps of:

notifying a user when a type of the sheet is in the list of sheet types requiring the static electricity removal process and the obtained setting indicates that the static electricity removal process is OFF;

notifying the user when the type of the sheet is not in the list of sheet types requiring the static electricity removal process and the obtained setting indicates that the static electricity removal process is ON;

causing the printer to print the image without issuing the notification when the type of the sheet is in the list of sheet types requiring the static electricity removal process and the obtained setting indicates that the static electricity removal process is ON;

causing the printer to print the image without issuing the notification when the type of the sheet is not in the list of sheet types requiring the static electricity removal process and the obtained setting indicates that the static electricity removal process is OFF; and executing printing of the image in response to an operation on a notification screen displayed by the notification.

* * * * *